Sept. 15, 1942.   F. J. WESTROPE   2,296,130
VISOR STRUCTURE
Filed April 26, 1941
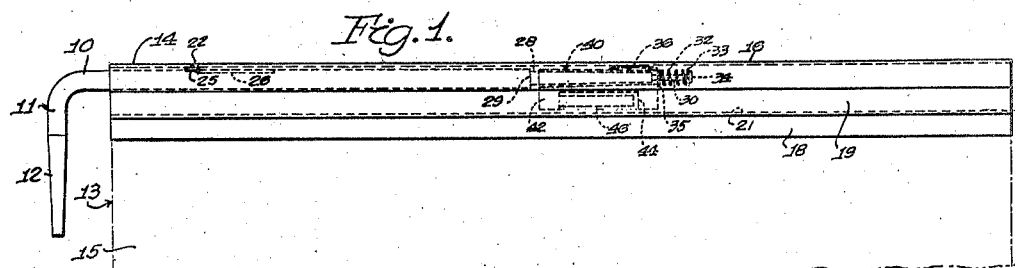
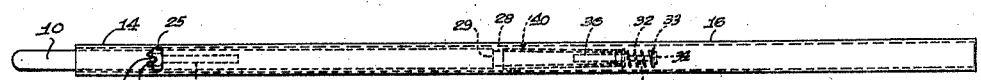
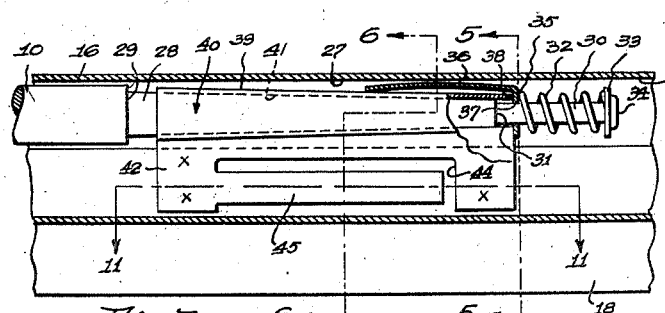
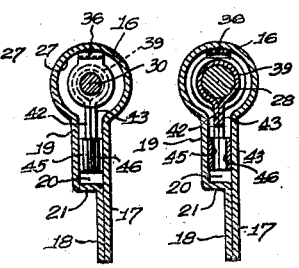
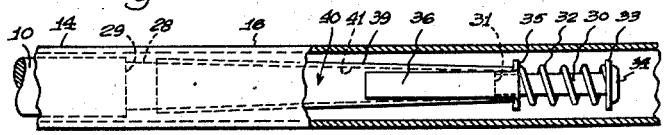
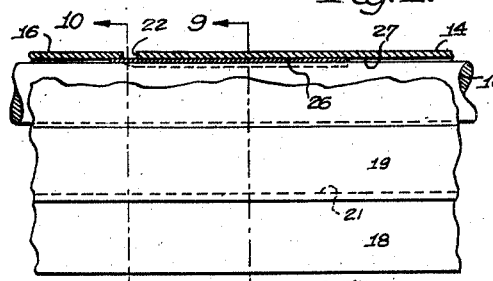
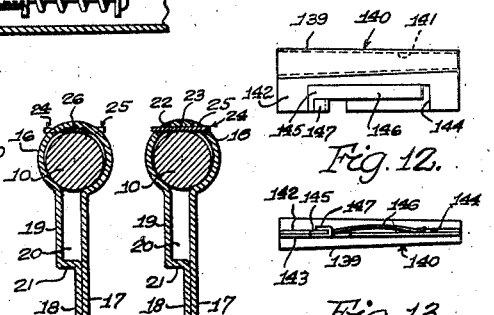
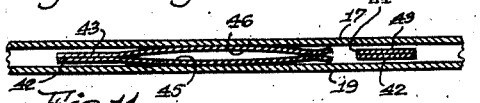
Inventor
Frederick J. Westrope
By
Attorneys Patented Sept. 15, 1942

2,296,130

UNITED STATES PATENT OFFICE 2,296,130

VISOR STRUCTURE

Frederick J. Westrope, Pleasant Ridge, Mich., assignor, by mesne assignments, to Reconstruction Finance Corporation, Detroit, Mich., a corporation of the United States Application April 26, 1941, Serial No. 390,530

13 Claims. (Cl. 296—97)

This invention relates to visors or glare shields, and in particular to those having provision for sliding the visor or glare shield axially along the supporting rod.

One object of this invention is to provide a visor structure having a visor or glare shield slidable along a supporting rod and incorporating resilient devices, such as springs, for preventing rattling of the visor or glare shield upon the rod.

Another object is to provide a visor structure having a visor or glare shield slidable axially along a rod, as well as swingable around the rod, with frictional means for holding the visor in its adjusted position of sliding or swinging combined with means for preventing rattling by relative motion between the visor or glare shield and its supporting rod.

Another object is to provide a visor structure as set forth in the preceding object wherein the rod is provided with a conical portion frictionally engaged by a member with a corresponding conical bore, this member being in turn engaged by the visor so as to frictionally hold the visor in any position to which it is swung around the axis of the rod.

Another object is to provide a visor structure having friction applying means for holding the visor in any position to which it is swung around the rod and also axially along the rod, together with spaced resilient means, such as springs, for preventing rattling arising by reason of relative motion between the visor and the rod.

In the drawing:

Figure 1 is a front elevation of a visor structure according to a preferred embodiment of the invention, with the supporting bracket omitted for conciseness of showing.

Figure 2 is a top plan view of the visor structure shown in Figure 1.

Figure 3 is an enlarged fragmentary elevation, partly in longitudinal section, showing the frictional adjusting means shown in dotted lines in Figure 1.

Figure 4 is an enlarged fragmentary plan view, partly in longitudinal section, of the structure shown in Figure 3.

Figure 5 is a cross section along the line 5—5 in Figure 3.

Figure 6 is a cross section along the broken line 6—6 in Figure 3.

Figure 7 is a fragmentary elevation, partly in longitudinal section, of the anti-rattle means shown in dotted lines near the left-hand end of Figure 1.

Figure 8 is an enlarged fragmentary plan view of the structure shown in Figure 7.

Figure 9 is a cross section along the line 9—9 in Figure 7.

Figure 10 is a cross section along the line 10—10 in Figure 7.

Figure 11 is a horizontal section along the line 11—11 in Figure 3, showing additional anti-rattle and frictional adjustment means.

Figure 12 is a side elevation of a modification of a friction holder shown in Figure 3.

Figure 13 is a bottom plan view of the friction holder shown in Figure 12.

In general, the visor structure of this invention consists of a rod having a conical portion thereon engaged by a friction holder having a conical bore, these elements being urged into frictional engagement by a coil spring. The friction holder is provided with a downwardly-extending longitudinal flange carrying a leaf spring. The friction holder also carries a second leaf spring movable at right angles to the previously-mentioned leaf spring. A pair of these second springs is shown in the drawing.

These leaf springs and the flange on the friction holder engage the interior walls of a tubular member slidable axially along the rod and having the glare shield or visor panel secured thereto. The tubular member at a point remote from the friction holder is also provided with a third leaf spring which yieldingly engages the supporting rod. These leaf springs not only serve to hold the visor panel in its adjusted position axially along the rod, but also serve to prevent rattling between the rod and the visor panel.

Hitherto, the types of glareshields or visors used in vehicles have been subject to annoying and noisy rattles which develop as a result of an excessively loose fit between the visor supporting rod and the visor tube superimposed on the rod and carrying the visor panel itself. These rattles appear when the vehicle is driven over roads with but very slight bumps or ridges, and not merely over rough roads. The insistent noise which has arisen as a result of rattling between the visor rod and tube has made many users dissatisfied with these visors. Such rattling is particularly serious in the case of visors which are not only rotatable around their supporting rods but also movable axially along these rods. The present invention not only provides suitable resilient means for frictionally holding the visor panel in any position either when swung around the rod or along the rod, but also prevents these annoying rattles.

Referring to the drawing in detail, Figure 1 shows a visor structure according to a preferred embodiment of the present invention and consisting of a visor-supporting rod 10 having a bent end 11 with a conical portion 12 suitable for attachment to a bracket (not shown), which in turn is secured to any convenient part of the vehicle, such as the roof thereof adjacent the windshield. Mounted on the rod 10 and slidable therealong, as well as swingable therearound, is a visor element generally designated 13 and consisting generally of a tubular member 14 to which is secured a glare shield or visor panel 15. The panel 15 is secured to the tubular member 14 in any desired way, such as by staples (not shown). The tubular member 14 (Figures 5, 6, 9 and 10) consists of an elongated body having a cylindrical tubular portion 16 terminating in downwardly-extending, mutually-engaging flanges 17 and 18, the latter having a portion 19 which is offset therefrom to form an elongated chamber 20 with a bottom wall 21.

In order to prevent rattling between the supporting rod 10 and tubular member 14, the latter (Figures 7 to 10) is provided with a cut-out aperture 22 having a tongue 23 formed integral with the tubular member 14 and serving to secure a T-shaped leaf spring 24 thereto. The cross bar 25 of the leaf spring 24 is held between the edge of the cutaway aperture 22 and the tongue 23, whereas the spring portion 26 extends longitudinally along the inner wall 27 of the tubular member 14 (Figure 7) where it exerts pressure against the supporting rod 10. This pressure serves not only to prevent rattles between the tubular member 14 and the rod 10, but also additionally assists in frictionally holding the visor element 13 in any desired position of adjustment axially along the rod 10.

The visor element 13 is also adjustable by being swung around the axis of the rod 10 and frictional means is provided for holding it in the position of adjustment. For this purpose, the end of the rod 10 is provided with a tapered conical portion 28 separated by the annular shoulder 29 from the rod 10 and terminating in an extension 30 separated from the conical portion 28 by the annular shoulder 31 (Figure 3). The extension 30 is encircled by a coil spring 32 having one end abutting a washer 33 held in position by the enlarged head 34 on the end of the extension 30 and at its opposite end abutting the base 35 of a leaf spring 36 having an aperture 37 through which the extension 30 passes. The leaf spring 36 frictionally and yieldingly engages the inner wall 27 of the tubular member 14 and consequently serves not only to prevent rattling but also to exert a frictional holding force for holding the visor element 13 in any desired position of adjustment along the rod 10.

The opposite side of the base 35 of the leaf spring 36 from the coil spring 32 engages the end 38 of the conical portion 39 of a friction holder generally designated 40 having an internal conical bore 41 corresponding to and frictionally engaging the conical portion 28 on the end of the rod 10 (Figure 3). Thus the base 35 of the leaf spring 36 also serves as a washer-like abutment for the coil spring 32 and enables the latter to urge the corresponding conical surfaces 41 and 28 into frictional engagement.

Extending radially away from the conical portion 39 of the friction holder 40 and running longitudinally therealong are the extensions 42 and 43 of the walls of the conical portion 39. These engage one another to form a downwardly-extending flange, and are provided with cut away portions 44 and integral leaf springs 45 and 46 normally movable into yielding frictional engagement with the inner surface of the offset portion 19 of the tubular member 14 within the chamber 20 (Figures 5, 6 and 11). The leaf springs 45 and 46 also not only serve to hold the visor element 15 in any desired position of adjustment along the rod 10 but also to prevent rattling therebetween.

The modified friction holder 140 shown in Figures 12 and 13 is similar to the friction holder 40 shown in Figure 3 in that it is provided with a conical portion 139, a conical internal bore 141, and radially-extending flanges or extensions 142 and 143. The extension 142 is likewise cut away to provide a recess 144 which is occupied by a leaf spring 146 having its base portion 145 held in position by a rib 147 bent around it from the extension 143. The action of the modified friction holder 140 in Figures 12 and 13 is similar to the friction holder 40 in the principal form of the invention.

In the operation of the invention, the tubular portion of the visor element 15 is slid over the end of the rod 10 carrying the friction holder 40, with the leaf springs 36, 45 and 46 respectively engaging the inner wall 27 of the cylindrical portion 16 and the inner wall of the offset portion 19. At the same time, the leaf spring 24 mounted on the tubular portion 14 yieldingly engages the top surface of the rod 10. These springs thus serve to hold the visor element 13 in any adjusted position along the rod 10 and also to prevent rattling therebetween. The frictional engagement between the friction holder 40 and the conical portion 28 on the end of the rod serves to permit the operator to swing the visor element 13 around the rod 10, yet the friction holds the visor in the adjusted position, even in spite of a considerable jarring or vibration arising during the travel of the vehicle. The coil spring 32 yields sufficiently to permit the visor element 13 to be swung around the rod 10, yet urges the conical portions 41 and 28 into frictional engagement after this swinging has been completed.

While a specific embodiment of the invention has been described and illustrated, it will be understood that various modifications may be made within the scope of the appended claims without departing from the spirit of the invention.

What I claim is:

1. In a visor structure, a visor-supporting rod having a tapered portion thereon, a correspondingly tapered member nesting with said tapered portion, a visor slidably mounted on said rod and tapered member, and yielding means disposed between said visor and said tapered member for preventing rattling therebetween.

2. In a visor structure, a visor-supporting rod having a tapered portion thereon, a correspondingly tapered member nesting with said tapered portion, a visor slidably mounted on said rod and tapered member, and a spring arranged between said visor and said tapered member for preventing rattling therebetween.

3. In a visor structure, a visor-supporting rod having a tapered portion thereon, a correspondingly tapered member nesting with said tapered portion, a visor slidably mounted on said rod and tapered member, and a leaf spring mounted on said rod adjacent said tapered member in engagement with said visor for preventing rattling therebetween.

4. In a visor structure, a visor-supporting rod having a tapered portion thereon, a correspondingly tapered member nesting with said tapered portion, a visor slidably mounted on said rod and tapered member, and a pair of springs mounted on said rod adjacent said tapered member and engaging said visor in different directions for preventing rattling therebetween.

5. In a visor structure, a visor-supporting rod having a tapered portion thereon, a correspondingly tapered member nesting with said tapered portion, and a visor slidably mounted on said rod and tapered member, said tapered member having a pair of springs mounted thereon and engaging said visor substantially at right angles for preventing rattling therebetween.

6. In a visor structure, a visor-supporting rod having a tapered portion thereon, a correspondingly tapered member nesting with said tapered portion, a visor slidably mounted on said rod and tapered member, a leaf spring mounted on said rod adjacent said tapered member in engagement with said visor for preventing rattling therebetween, and an additional spring disposed between said visor and said rod remote from the first spring for additionally preventing rattling therebetween.

7. In a visor structure, a visor-supporting rod having a tapered portion thereon, a correspondingly tapered member nesting with said tapered portion, a visor slidably mounted on said rod and tapered member, a pair of springs mounted on said rod adjacent said tapered member and engaging said visor in different directions for preventing rattling therebetween, and an additional spring disposed between said visor and said rod remote from said pair of springs for additionally preventing rattling therebetween.

8. In a visor structure, a visor-supporting rod having a tapered portion thereon, a correspondingly tapered member nesting with said tapered portion, means for yieldingly urging said tapered member into frictional engagement with said tapered portion, a hollow tubular visor support slidably engaging said rod and encircling said tapered member, said tapered member and said tapered rod portion being disposed within said hollow tubular visor support and a visor panel secured to said hollow support.

9. In a visor structure, a visor-supporting rod having a tapered portion thereon, a correspondingly tapered member nesting with said tapered portion, means for yieldingly urging said tapered member into frictional engagement with said tapered portion, a hollow support slidably engaging said rod and tapered member, a visor panel secured to said hollow support, and a leaf spring disposed between said hollow support and said rod remote from said tapered portion for preventing rattling therebetween.

10. In a visor structure, a visor-supporting rod having a tapered portion thereon, a correspondingly tapered member nesting with said tapered portion, means for yieldingly urging said tapered member into frictional engagement with said tapered portion, a hollow support slidably engaging said rod and tapered member, a visor panel secured to said hollow support, and a spring mounted adjacent said tapered portion and tapered member in engagement with said hollow support for preventing rattling therebetwen.

11. In a visor structure, a visor-supporting rod having a tapered portion thereon, a correspondingly tapered member nesting with said tapered portion, means for yieldingly urging said tapered member into frictional engagement with said tapered portion, a hollow support slidably engaging said rod and tapered member, a visor panel secured to said hollow support, and a pair of springs mounted adjacent said tapered portion and tapered member engaging said hollow support in different directions for preventing rattling therebetween.

12. In a visor structure, a visor-supporting rod having a tapered portion thereon, a correspondingly tapered member nesting with said tapered portion, means for yieldingly urging said tapered member into frictional engagement with said tapered portion, a hollow support slidably engaging said rod and tapered member, a visor panel secured to said hollow support, a pair of springs mounted adjacent said tapered portion and tapered member engaging said hollow support in different directions for preventing rattling therebetween, and a third spring disposed between said hollow support and said rod remote from said tapered portion for additionally preventing rattling therebetween.

13. In a visor structure, a visor-supporting rod having a tapered portion thereon, a correspondingly tapered member nesting with said tapered portion, means for yieldingly urging said tapered member into frictional engagement with said tapered portion, a hollow support slidably engaging said rod and tapered member, a visor panel secured to said hollow support, and a pair of springs mounted adjacent said tapered portion and tapered member engaging said hollow support in different directions for preventing rattling therebetween, one of said springs being secured to said tapered member and the other being mounted on said rod between said tapered member and said yielding means.

FREDERICK J. WESTROPE.